March 23, 1926.
T. R. DAVIS
1,578,238
CAST METAL VEHICLE WHEEL
Filed May 29, 1924     3 Sheets-Sheet 1
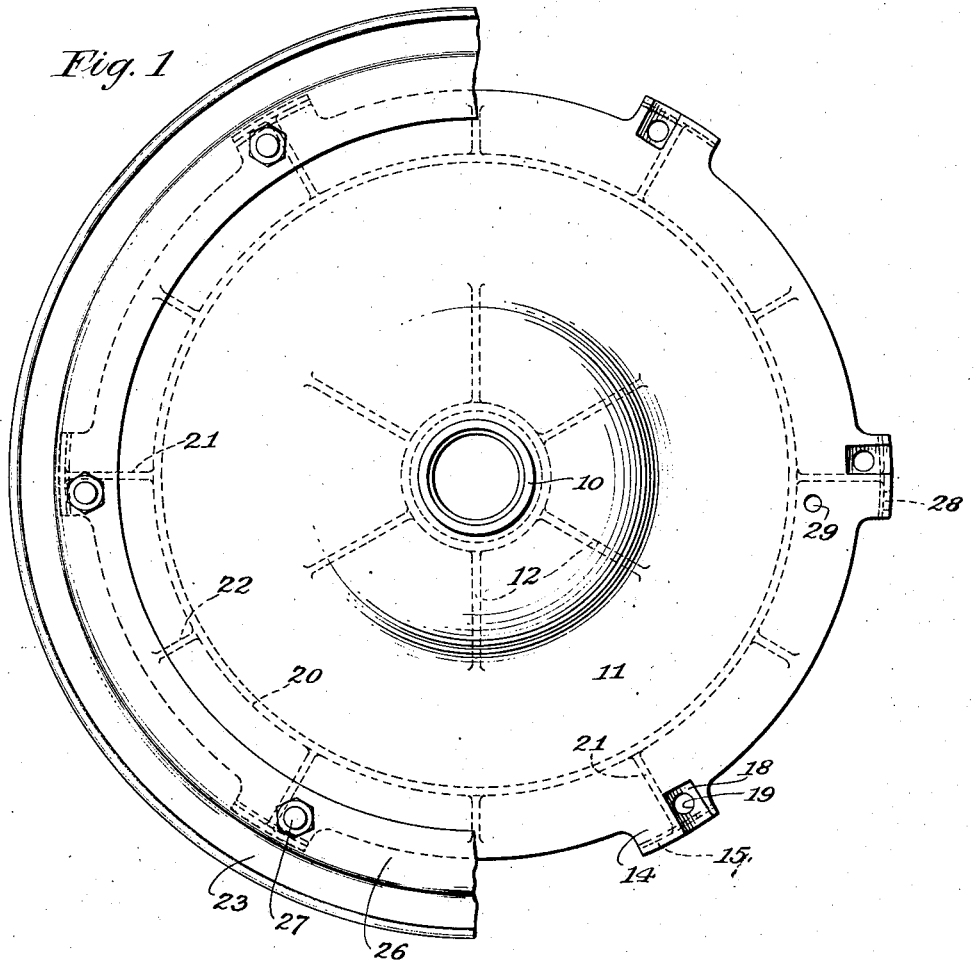
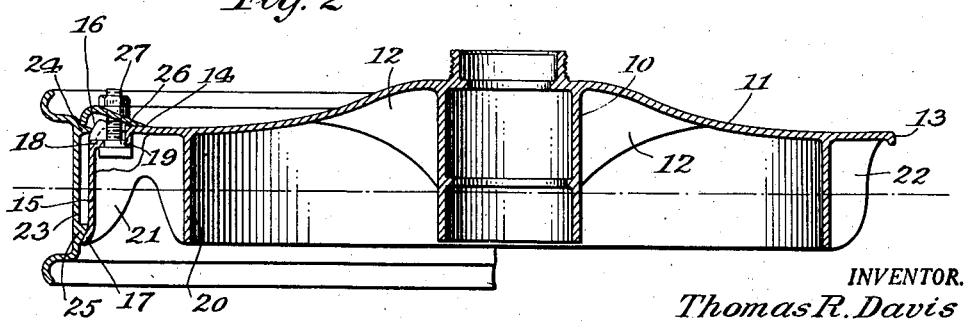
INVENTOR.
Thomas R. Davis
BY
Chamberlain & Newman ATTORNEYS.

March 23, 1926.  
T. R. DAVIS  
1,578,238  
CAST METAL VEHICLE WHEEL  
Filed May 29, 1924     3 Sheets-Sheet 2
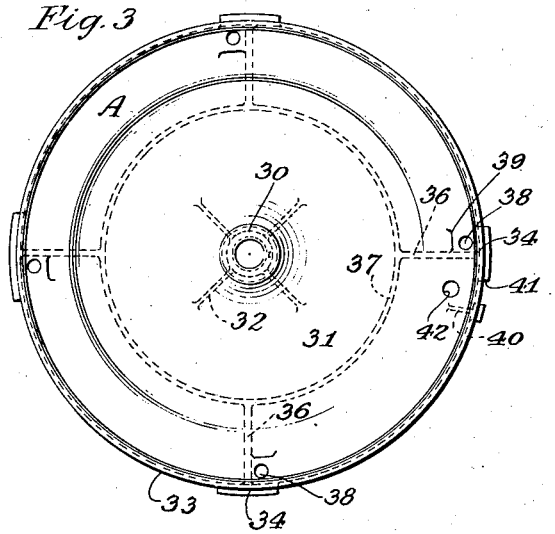
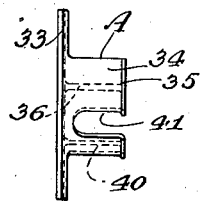
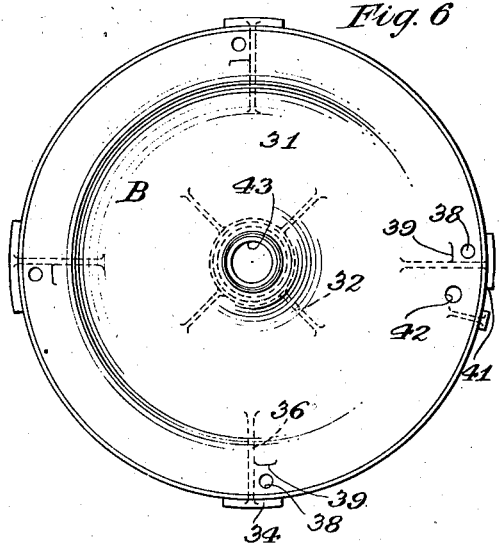
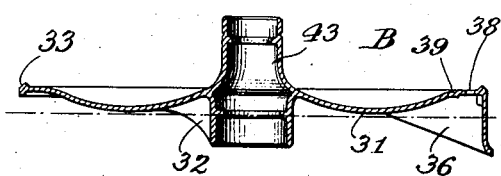
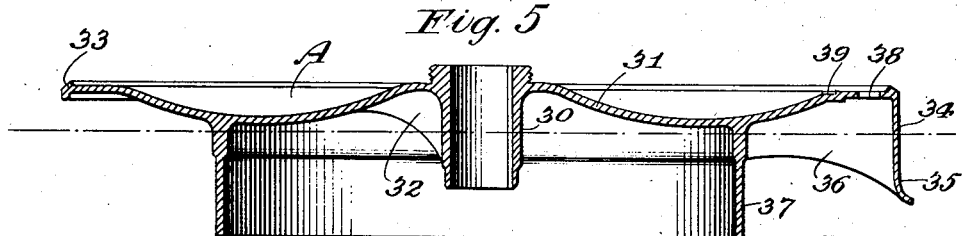
INVENTOR.  
*Thomas R. Davis*  
BY  
*Chamberlain & Newman* ATTORNEYS.

March 23, 1926.
T. R. DAVIS
1,578,238
CAST METAL VEHICLE WHEEL
Filed May 29, 1924    3 Sheets-Sheet 3
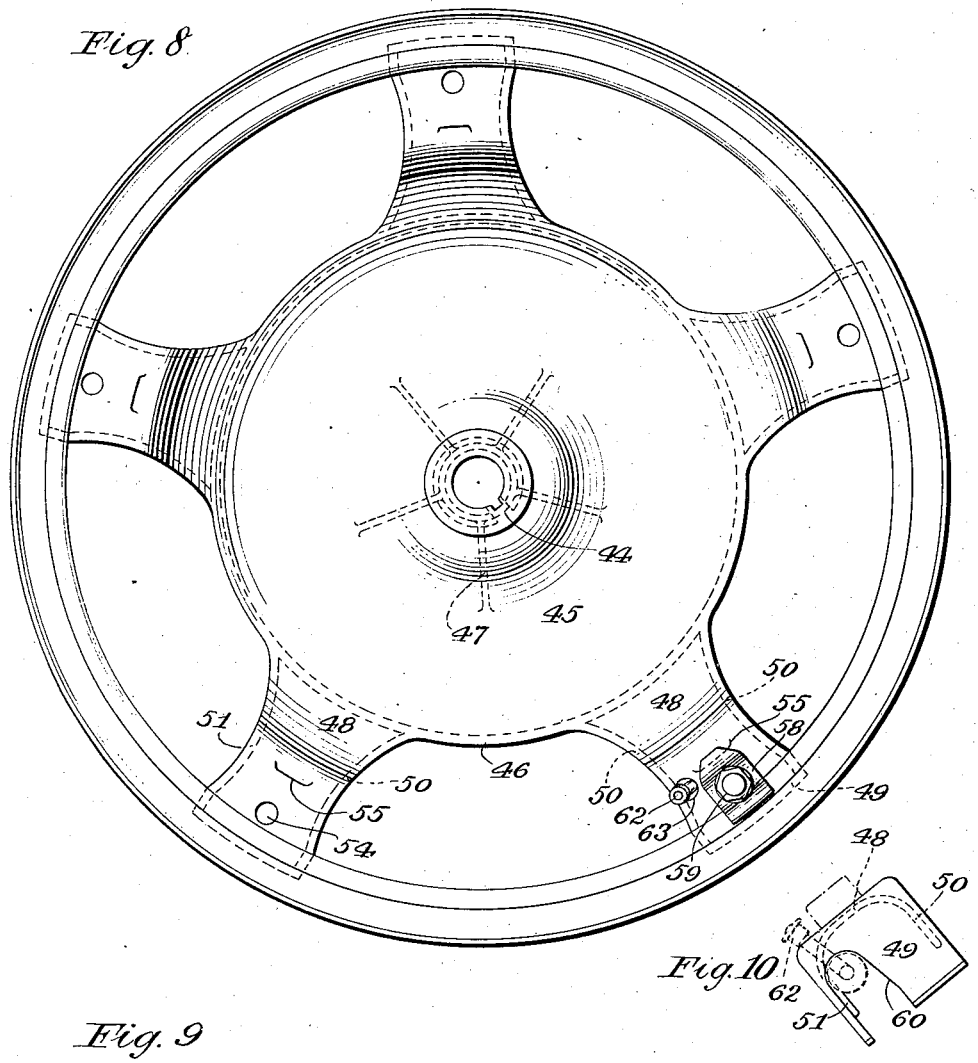
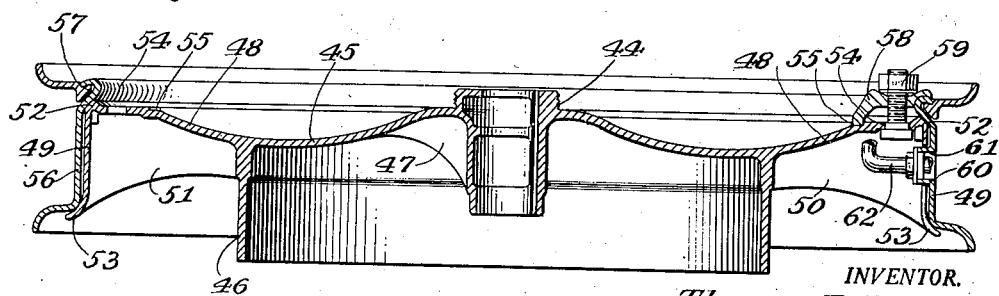
INVENTOR.
Thomas R. Davis
BY
Chamberlain & Newman ATTORNEYS.

Patented Mar. 23, 1926.

1,578,238

UNITED STATES PATENT OFFICE.

THOMAS RICE DAVIS, OF FAIRFIELD, CONNECTICUT, ASSIGNOR TO THE EASTERN MALLEABLE IRON CO., OF BRIDGEPORT, CONNECTICUT, A CORPORATION OF CONNECTICUT.

CAST-METAL VEHICLE WHEEL.

Application filed May 29, 1924. Serial No. 16,585.

*To all whom it may concern:*

Be it known that THOMAS R. DAVIS, a citizen of the United States, and resident of Fairfield, in the county of Fairfield and State of Connecticut, has invented certain new and useful Improvements in Cast-Metal Vehicle Wheels, of which the following is a specification.

This invention relates to an improved metal vehicle wheel, and has for an object to provide such a wheel of disk type, in the form of a single casting, and a demountable tire carrying rim, adapted to be secured to the periphery of the disk wheel structure.

Another object is to provide a wheel structure of relatively great strength, so as to withstand torsional, weight and side strains, and which will at the same time be of extremely light weight, as compared with cast wheels heretofore in use.

A further object is to provide in such a wheel structure a plurality of spaced rim supporting means integral therewith, and so designed as to provide adequate support for the rim, and at the same time not add greatly to the weight of the wheel.

A still further object is to provide a wheel having an integral brake drum, adapting the same to use as either a front or rear brake-equipped wheel, and also to provide an improved co-relative brake and wheel structure in which the brake is centralized with respect to the central plane of rotation of the wheel, so that the most efficient braking is obtained, this being particularly important with front wheel brakes.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a front elevation of a cast wheel, according to the invention, adapted for front axle use, and showing the rim partially broken away;

Fig. 2 is a transverse sectional view thereof;

Fig. 3 is a front elevation of a cast wheel, according to a modified form thereof, adapted for rear axle use, and the tire carrying rim being removed;

Fig. 4 is a side elevation of one of the rim seats, as provided on the wheel structure shown in Fig. 3;

Fig. 5 is a transverse sectional view of the wheel shown in Fig. 3;

Fig. 6 is a front elevation of another modified form of wheel, according to the invention, and adapted for front axle use;

Fig. 7 is a transverse sectional view thereof;

Fig. 8 is a front elevation of a further modified form of wheel, adapted for rear axle use;

Fig. 9 is a transverse sectional view thereof; and

Fig. 10 is a detail side view of one of the rim seats.

Similar reference characters indicate corresponding parts throughout the several figures of the drawings.

Referring to the drawings, and more particularly to Figs. 1 and 2 thereof, the embodiment of the invention shown therein comprises a hub 10, illustrated as adapted for use upon the front axle spindles of an automobile, but which may be designed for rear axle use, and a main plate or web portion 11 formed integrally with the hub, and curved rearwardly from its point of connection to a relatively flat marginal portion, radial reinforcing ribs 12 being formed integrally between the hub and the inner surface of the web.

At its periphery the web is provided with a relatively small bead 13 (Fig. 2), and at a plurality of equally spaced points there are provided radial extension portions 14 of the main web portion having inwardly extending rim seats 15 formed integrally therewith, being slightly beveled at their forward ends, as at 16, and flared outwardly at their rearward ends, as at 17, for seating engagement therewith of the rim, as will presently more fully appear. The extensions 14 are furthermore each provided with a recessed portion 18 having a hole 19 therein for engagement of the rim retaining bolts.

In inwardly spaced relation to its periphery the web is provided at its inner surface with an annular cylindrical brake drum portion 20, formed integrally therewith, reinforced by radial ribs 21 extending between the same and the rim seats 15, and which also reinforce the said seats, and also by reinforcing ribs 22 provided centrally between the ribs 21.

The flanged tire supporting rim 23 is provided at its inner surface and adjacent the forward and rearward flanges with annular flange ribs 24 and 25, adapted to seat upon the beveled portions 16 and the flanged portions 17 of the rim seats, respectively, and the rim is secured by a continuous retaining ring 26 bearing upon the front surface of the web and the flanges rib 24 of the rim, and held by bolts 27 engaged in the holes 19. This ring 26 closes the peripheral spaces of the web portion between the extension 14 so that a solid disc structure is presented.

One of the rim seats 15 is preferably provided with an aperture 28 for the tire valve stem, and an opening 29 is furthermore provided in the web for the end of the stem, which is bent at a right angle, to project through said opening 29.

The wheel, according to my invention, may be cast by simple and efficient casting methods, and a light strong structure is provided. The provision of the spaced extensions 14 and the closing ring 26 produces a solid disc structure, which at the same time is extremely light in weight.

In Figs. 3 to 5 there is illustrated a modified construction, comprising a hub 30, adapted for use upon a rear axle spindle, and an integral web or disk 31, dished between the hub, and a flat marginal portion, and reinforced by ribs 32 between the hub and the underside of the web. At the periphery of the web there is provided a beveled bead 33, and at equally spaced points integral rim seats 34 are formed, extending rearwardly and at right angles to the web, and being flared at their inner ends, as at 35, to retain the tire carrying rim thereon. Radial reinforcing ribs 36 extend between the rim seats and a cylindrical brake drum 37 formed integral with the web, and bolt holes 38 are provided in the web adjacent the rim seats for the purpose of receiving the retaining bolts for the rim retaining lugs. In inwardly spaced relation and in radial alignment with the holes 38 the web is provided with pockets 39 for positioning the ends of the rim retaining lugs.

One of the rim seats is wider than the others, having an additional reinforcing web 40, and is provided with an aperture 41 for receiving the tire valve stem, the end of which is adapted to be projected through a hole 42 in the web. The opposed rim seat is also wider than the others, for the purpose of counterbalancing the apertured rim seat, and therefore balancing the wheel.

In Figs. 6 and 7 there is shown a further modification, substantially similar to the form shown in Figs. 3 to 5, without a brake drum, however, and provided with an integral front axle spindle hub 43. This form may also have a brake drum, if desired.

In Figs. 8 to 10 there is shown a still further modification, and what may be termed a semi-disc-semi-spoke type. The hub 44 is illustrated as of the rear axle type, and has an integral dished main web portion 45 extending outwardly therefrom, and provided at its circumferential periphery with an inwardly extending brake drum 46, reinforcing ribs 47 being provided between the hub and the inner side of the web.

A plurality of radial extension or spoke portions 48 of the main web portion extend outwardly from the main web portion in unbroken continuation thereof, and are provided at their ends with integral rim seat portions 49 extending inwardly at right angles thereto, reinforcing side flanges 50 and 51 extending along the side edges of the extensions between the brake drum and the rim seats.

The rim seats are beveled at their forward ends, as at 52, and flared at their rearward ends, as at 53, and in inwardly spaced relation to the seats the extensions are provided with holes 54 for engagement of the retaining bolts, while in further inwardly spaced relation there are provided recesses 55 for positioning the lugs.

The flanged tire carrying rim 56, illustrated in this embodiment, is provided with a removable rim flange engaged in an annular groove 57 of the rim, and is retained in engagement with the rim seats by lugs 58 secured by bolts 59 engaged in the holes 54. One of the rim seats is provided with an aperture 60 for the flanged and apertured driving lug 61 of the rim, and the tire valve stem 62 engaged in said lug, the end of said stem adapted to be projected through a hole 63 in the spoke extension portion 48.

The construction, according to this embodiment of the invention, is of great strength, may be conveniently and efficiently cast, and by reason of the semi-spoke structure is extremely light in weight.

It will be noted, particularly with reference to the embodiment illustrated in Figs. 1 and 2, that the brake drum is circumferentially aligned with the rim, and that the central plane of rotation of the tire, and therefore the point of contact with the ground, passes centrally through the brake drum, so that the braking resistance is applied in direct line with the torsional moment of the wheel, and the maximum braking efficiency is thus obtained. This is particularly important with front wheels, where any off-center resistance is apt to impair the steering of the wheels.

I have illustrated and described preferred and satisfactory embodiments of the invention, but it will be obvious that changes may be made therein, within the spirit and scope thereof, as defined in the appended claims.

Having thus described my invention, what

I claim and desire to secure by Letters Patent is:

1. In a vehicle wheel, a casting including an integral hub and web structure, spaced rim seats integrally formed about the periphery of said web structure, unconnected at the rim to provide unbridged spaces between said seats, a demountable rim engaged upon said seats, and means adapted to secure said rim to said seats.

2. In a vehicle wheel, a casting including an integral hub and web structure, radial reinforcing ribs disposed between the hub and inner surface of said web structure, spaced rim seats integrally formed about the periphery of said web structure, unconnected at the rim to provide unbridged spaces between said seats, a demountable rim engaged upon said seats, and means adapted to secure said rim to said seats.

3. In a vehicle wheel, a casting including an integral hub and web structure, spaced rim seats integrally formed about the periphery of said web structure, unconnected at the rim to provide unbridged spaces between said seats, a demountable rim engaged upon said seats, means adapted to secure said rim to said seats, and radial reinforcing ribs integrally formed between said rim seats and the inner surface of the web.

4. In a vehicle wheel, a casting including an integral hub and web structure, a cylindrical brake drum integrally formed upon the inner side of the web structure, spaced rim seats integrally formed about the periphery of said web structure, unconnected at the rim to provide unbridged spaces between said seats, a demountable rim engaged upon said seats, and means adapted to secure said rim to said seats.

5. In a vehicle wheel, a casting including an integral hub and web structure, a cylindrical brake drum integrally formed upon the inner side of the web structure, spaced rim seats integrally formed about the periphery of said web structure, radial reinforcing ribs integrally formed between said rim seats, web and the outer cylindrical surface of said brake drum, a demountable rim engaged upon said rim seats, and means adapted to secure said rim to said rim seats.

6. In a vehicle wheel, a casting including an integral hub and web structure, said web structure including spaced radial extension portions formed integrally therewith, rim seats formed integrally upon the ends of said extension portions, a demountable rim engaged upon said seats, and means adapted to secure said rim to said seats.

7. In a vehicle wheel, a casting including an integral hub and web structure, spaced rim seats formed integrally about the periphery of said web structure unconnected at the rim to provide unbridged spaces between said seats and having beveled forward portions and outwardly flanged rearward portions, and said web portion having retaining bolt receiving holes adjacent each rim seat, a demountable rim engaged upon said seats, and means engaged in said holes adapted to secure said rim to said seats.

8. In a vehicle wheel, a casting including an integral hub and web structure including a circular web portion, a cylindrical brake drum integrally formed upon the periphery of said circular web portion, said web structure including spaced radial extension portions formed integrally with said circular web portion and extending radially outward from said brake drum, rim seats formed integrally upon the ends of said extension portions, and a demountable rim engaged upon said seats and means adapted to secure said rim to said seats.

9. In a vehicle wheel, a casting including an integral hub and web structure including a circular web portion, a cylindrical brake drum integrally formed upon the periphery of said circular web portion, said web structure including spaced radial extension portions formed integrally with said circular web portion and extending radially outward from said brake drum, rim seats formed integrally upon the ends of said extension portions, reinforcing radial ribs formed integrally between said rim seats, web, and the outer cylindrical surface of the brake drum, a demountable rim engaged upon said seats, and means adapted to secure said rim to said seats.

10. In a vehicle wheel, a casting including an integral hub and web structure, spaced rim seats integrally formed about the periphery of said web structure, unconnected at the rim to provide unbridged spaces between said seats and extending at an angle to said web structure and in substantially parallel relation to the axis of the wheel, a demountable rim engaged upon said seats, and means adapted to secure said rim to said seats.

11. In a vehicle wheel, a casting including an integral hub and circular web portion, a brake drum element formed upon the inner side of said web portion, spaced rim seats radially spaced from and disposed about said drum, and a demountable rim engaged upon said seating means, the central plane of rotation of said rim passing through the central plane of the brake element.

Signed at Bridgeport in the county of Fairfield and State of Connecticut this 28th day of May A. D., 1924.

THOMAS RICE DAVIS.